May 19, 1959  A. J. ERIKSSON  2,887,441
METHOD OF RECOVERING CARBON DISULPHIDE AND HYDROGEN
SULPHIDE FROM DILUTED AQUEOUS SOLUTIONS
Filed July 11, 1955
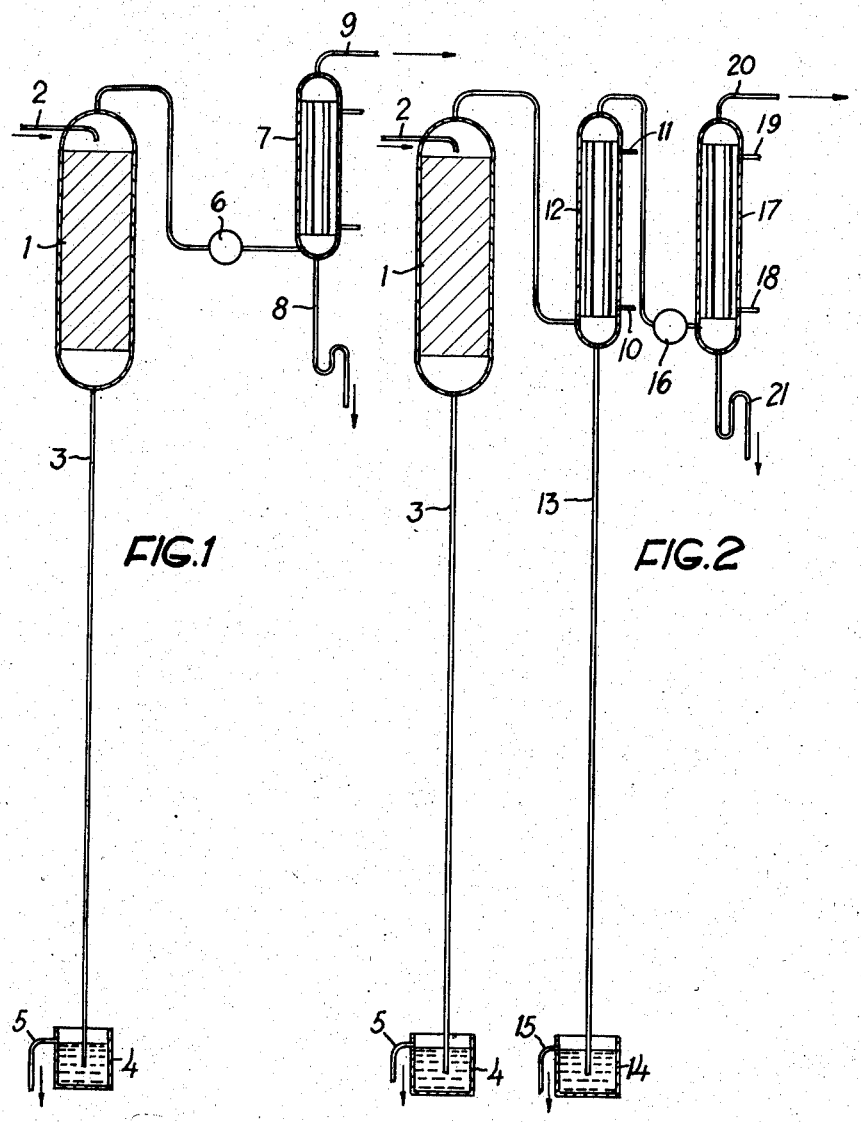
INVENTOR.
Artur Johannes Eriksson
BY
Cushman, Darby & Cushman
Attorneys

United States Patent Office 2,887,441
Patented May 19, 1959

2,887,441

METHOD OF RECOVERING CARBON DISULPHIDE AND HYDROGEN SULPHIDE FROM DILUTED AQUEOUS SOLUTIONS

Artur Johannes Eriksson, Boras, Sweden, assignor to Aktiebolaget Svenskt Konstsilke, Boras, Sweden, a corporation of Sweden Application July 11, 1955, Serial No. 520,958

1 Claim. (Cl. 202—52)

In the viscose industry there occur relatively large amounts of waste water which arise from washing the freshly spun threads, fibres, foils, etc. This waste water contains among other things carbon disulphide and hydrogen sulphide in low concentrations which in many cases may cause trouble by polluting the watercourse into which they are discharged. Although the concentration of carbon disulphide in the waste water is very low, it nevertheless represents an appreciable loss owing to the large quantities of waste occurring, so that a cheap way of recovering carbon disulphide implies an important economic advantage in addition to an obvious improvement in the sanitary conditions in the recipient water course. A separation of hydrogen sulphide in the waste water and turning it into a concentrated form should also imply substantial advantages, as the hydrogen sulphide, which owing to its reducing power is detrimental to the watercourse, may in this way easily be rendered innocuous. It has been previously known, e.g. from British Patent No. 498,799 and French Patent No. 870,444, to carry out the process above referred to by blowing through the liquid finely dispersed air or finely dispersed gases such as nitrogen, smoke gases, etc. Thus in French Patent No. 870,444 a method is described in which water is freed from hydrogen sulphide by blowing in smoke gases in finely dispersed form. In the British patent above referred to a method is described for recovering carbon disulphide from aqueous solutions by blowing in finely dispersed air, nitrogen or combustion gases, a low pressure being at the same time maintained in the apparatus. It is true that by the methods referred to the effect is obtained that the aqueous solution is freed from the volatile materials, but these latter are simultaneously diluted with large quantities of air or gas which renders the subsequent treatment more difficult, be it that this aims at rendering the volatile materials innocuous or at recovering them. A further inconvenience is that in certain cases special gases, e.g. nitrogen, have to be used which then, for economic reasons, have to be led into a closed system and used repeatedly.

The present invention has for its object to remove these inconveniences without thereby causing the result of the treatment to be reduced in quality. The principle underlying the present invention is that the waste water containing carbon disulphide and hydrogen sulphide is led, without preceding heating through a vessel in which such a low pressure prevails that the waste water boils. The vapours and gases in this way leaving the waste water, consisting of carbon disulphide, hydrogen sulphide, water vapour and gases dissolved in the waste water, are continuously exhausted from the vessel, the carbon disulphide and water vapour then conveniently lending themselves to being condensed out or absorbed, and the hydrogen sulphide being obtained in a relatively concentrated form, diluted only by the air and nitrogen which was dissolved in the waste water, by water vapour and some carbon disulphide. By reason of the concentration of the hydrogen sulphide in the residual gases, to be found for example after the carbon disulphide has been condensed out, being high, the rendering innocuous of the hydrogen sulphide, e.g. by combustion or neutralisation, is comparatively cheap.

The invention will now be further explained by way of an example of how it may be carried into effect, in which the waste water from the viscose industry is freed from its contents of carbon disulphide and hydrogen sulphide. The invention is not, however, thereby limited to only the treatment of solutions originating in the viscose industry but is applicable to any aqueous solutions containing carbon disulphide and/or hydrogen sulphide.

*Example*

Waste water containing 500 mg./l. carbon disulphide and 6 mg./l. hydrogen sulphide and having a temperature of 22° C. was continuously treated according to the invention. The pressure during treatment was about 15 mm. Hg, at which temperature the waste water was boiling. After the treatment the carbon disulphide content of the waste water had been reduced to 50 mg./l. and its content of hydrogen sulphide to 0.1 mg./l. The temperature of the waste water after treatment was 21° C.

The vapours developed during boiling were condensed by cooling. From the condensate carbon disulphide was separated by decanting. The non-condensible gases, consisting of hydrogen sulphide, nitrogen and oxygen, had a total volume of only about 1 percent of the quantity of waste water treated.

In what follows the invention is to be further illustrated with reference to two arrangements shown in the accompanying drawings for carrying out the method, of which Fig. 1 shows a simple form with an expulsion vessel provided with a barometer tube and connected with a vacuum pump and a cooling device for the gases released. Fig. 2 shows a somewhat modified form of arrangement comprising two cooling devices.

In the drawings, 1 is the vessel through which the waste water runs continuously and in which the liquid is finely dispersed or spread out in a thin layer in some suitable manner which may for instance be achieved by causing the waste water to run down the wall of the vessel in the form of a thin layer or by finely dispersing it by means of a nozzle or by having the vessel filled with packing over which the liquid is introduced. The waste water is introduced into the vessel 1 continuously by way of the pipe 2 and flows out through the barometric leg 3 to a water-seal well 4 from where it runs off through a pipe 5, nearly freed from carbon disulphide and hydrogen sulphide. The barometric leg 3 must of course, have such a length that the water column inside it balances the outer air pressure. This barometric leg may, of course, be replaced by some other device, e.g. a pump drawing the water from vessel 1. In the arrangement shown in the figure, a vacuum pump 6 is connected to the vessel 1. This vacuum pump is so dimensioned that a low enough pressure is maintained in vessel 1 to cause the waste water supplied to it to boil. The gases, carbon disulphide and water vapour released in boiling pass through a cooling device 7 of suitable construction, the condensible vapours being separated off and taken through pipe 8, and the noncondensible gases being led off through a pipe 9.

Fig. 2 shows a different form of the cooling device, in that the vapours from the vessel 1 are first made to pass through a cooling device 12 before being led on through the vacuum pump 16 to the cooling device 17 from which condensate runs off through a pipe 21 whilst the noncondensible gases pass off through a pipe 20. With this arrangement, if conditions are suitably chosen, the advantage is obtained that the greater part of the water vapour is condensed out in the cooling device 12 whereas condensation of carbon disulphide mainly takes place in the cooling device 17, as a consequence of which the vacuum pump 16 may be of smaller dimensions, as it need not transport the water vapour separated out in the cooling device 12.

Instead of a single vacuum pump 6 or 16 two or more vacuum pumps coupled in series may be used, preferably with gas cooling devices arranged between the pumps.

Instead of the cooling device 17 suitable arrangements may be used to cause absorption of carbon disulphide on e.g. active charcoal and of hydrogen sulphide in e.g. alkali. Further, suitable devices may be fitted to follow the cooling device 17 to render innocuous the hydrogen sulphide, e.g. by combustion.

Instead of the tubular cooling devices 7, 12 and 17 shown in Figs. 1 and 2, other known or suitable cooling devices may, of course, be used for the condensation of the vapours.

What I claim is:

A process for continuously recovering carbon disulfide and hydrogen sulfide from waste waters resulting from the production of viscose filaments which comprises passing said waste waters at room temperature into a confined zone, boiling the water in said confined zone at a pressure of about 15 mm. Hg, and recovering the vapors containing the carbon disulfide and hydrogen sulfide, whereby the water is substantially free from said carbon disulfide and hydrogen sulfide.

References Cited in the file of this patent

UNITED STATES PATENTS

| | | |
|---|---|---|
| 1,515,656 | Clemm | Nov. 18, 1924 |
| 2,042,016 | Moritz | May 26, 1936 |
| 2,067,364 | Weber | Jan. 12, 1937 |
| 2,254,237 | Nash | Sept. 2, 1941 |
| 2,673,785 | Hall | Mar. 30, 1954 |